United States Patent
Mori

(10) Patent No.: US 12,380,264 B2
(45) Date of Patent: Aug. 5, 2025

(54) LEARNING APPARATUS, INFERENCE APPARATUS, AND PROGRAMMABLE LOGIC DEVICE DEVELOPMENT TOOLCHAIN

(71) Applicant: Mitsubishi Electric Corporation, Tokyo (JP)

(72) Inventor: Atsuhiro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 324 days.

(21) Appl. No.: 17/920,848

(22) PCT Filed: Jun. 1, 2021

(86) PCT No.: PCT/JP2021/020784
§ 371 (c)(1),
(2) Date: Oct. 24, 2022

(87) PCT Pub. No.: WO2021/251206
PCT Pub. Date: Dec. 16, 2021

(65) Prior Publication Data
US 2023/0342530 A1    Oct. 26, 2023

(30) Foreign Application Priority Data
Jun. 9, 2020 (JP) ................. 2020-100016

(51) Int. Cl.
*G06F 30/30* (2020.01)
*G06F 30/27* (2020.01)
(Continued)

(52) U.S. Cl.
CPC ............ *G06F 30/343* (2020.01); *G06F 30/27* (2020.01); *G06F 30/347* (2020.01); *G06F 30/34* (2020.01)

(58) Field of Classification Search
None
See application file for complete search history.

(56) References Cited

U.S. PATENT DOCUMENTS 7,500,216 B1 * 3/2009 Blunno ................ G06F 30/327
716/104
8,347,243 B2 * 1/2013 Bruneel ................ G06F 30/34
716/117
(Continued)

FOREIGN PATENT DOCUMENTS

| JP | 2016-095606 A | 5/2016 |
| JP | 2020504403 A | 2/2020 |
| WO | 2018136156 A1 | 7/2018 |

OTHER PUBLICATIONS

Notice of Reasons for Refusal dated Nov. 28, 2023, issued in the corresponding Japanese Patent Application No. 2022-530483, 8 pages including 4 pages of English Translation.
(Continued)

*Primary Examiner* — Leigh M Garbowski
(74) *Attorney, Agent, or Firm* — Buchanan Ingersoll & Rooney PC

(57) ABSTRACT

A data acquisition unit acquires resource usage rate data for each technology of a programmable logic apparatus development toolchain and timing slack information during technology mapping. An inference unit outputs an iterative synthesis parameter for succeeding in place and route from the resource usage rate data for each technology and the timing slack information during the technology mapping that are acquired by the data acquisition unit using a learned model for inferring an iterative synthesis parameter given to the programmable logic apparatus development toolchain for succeeding in the place and route from the resource
(Continued)

usage rate data for each technology and the timing slack information during the technology mapping.

14 Claims, 4 Drawing Sheets

(51) Int. Cl.
*G06F 30/343* (2020.01)
*G06F 30/347* (2020.01)
*G06F 30/34* (2020.01)

(56) References Cited

U.S. PATENT DOCUMENTS

| | | | |
|---|---|---|---|
| 8,365,111 B2* | 1/2013 | Chen | G06F 30/33 716/108 |
| 9,703,920 B2* | 7/2017 | Berry | G06F 30/398 |
| 9,792,397 B1* | 10/2017 | Nagaraja | G06F 30/32 |
| 9,892,223 B1* | 2/2018 | Nagaraja | G06F 30/32 |
| 10,437,954 B1 | 10/2019 | White et al. | |

OTHER PUBLICATIONS

International Search Report (PCT/ISA/210) with translation and Written Opinion (PCT/ISA/237) mailed on Aug. 3, 2021, by the Japan Patent Office as the International Searching Authority for International Application No. PCT/JP2021/020784. (9 pages).

Notice of Reasons for Refusal dated Nov. 28, 2023, issued in the corresponding Japanese Patent Application 1 No. 2022-530483, 8 pages including 4 pages of English Translation.

\* cited by examiner

LEARNING APPARATUS, INFERENCE APPARATUS, AND PROGRAMMABLE LOGIC DEVICE DEVELOPMENT TOOLCHAIN

TECHNICAL FIELD

The present disclosure relates to a learning apparatus, an inference apparatus, and a programmable logic device development toolchain.

BACKGROUND ART

In recent years, with evolution of a semiconductor process generation, cost of development of a custom application specific integrated circuit (ASIC) has increased. For this reason, there is an increasing need for a programmable logic device such as a field programmable gate array (FPGA) or a dynamic reconfigurable processor (DRP).

In a toolchain that develops a user application circuit using these programmable devices, there are several major processes such as high-level synthesis, logic mapping, and place and route. Among them, the place and route requires particularly long execution time. In order to complete the place and route, it is necessary to repeat trial by changing constraint conditions such as a clock frequency and an input and output delay settings, a tool options, and the like, variously. In particular, when a relatively large circuit is developed using a device with a reduced cost, the time required for trial has a large influence on a development period.

For example, in PTL 1, in order to improve performance of an EDA tool for semiconductor circuit design, a feature vector of the circuit is extracted, and a first place and route topology recommended by the tool is generated with reference to a feature amount library. PTL 1 describes a technique of generating still another recommended place and route topology based on the first place and route topology.

CITATION LIST

Patent Literature

PTL 1: U.S. Pat. No. 10,437,954

SUMMARY OF INVENTION

Technical Problem

In PTL 1, an appropriate topology for the place and route is recommended by obtaining a feature amount of a circuit. However, the technique described in PTL 1 is specialized in ASIC circuit design, and application to the programmable logic device is not considered.

An object of the present disclosure is to provide a learning apparatus, an inference apparatus, and a programmable logic device development toolchain that can implement high-speed place and route when a user application circuit is developed by using the programmable logic device.

Solution to Problem

A learning apparatus of the present disclosure includes: a data acquisition unit to acquire learning data including resource usage rate data for each technology of a programmable logic device development toolchain and timing slack information during technology mapping and including a target clock frequency of the programmable logic device development toolchain and an iterative synthesis parameter in the resource usage rate data for each technology and the timing slack information during the technology mapping; and a model generation unit to generate, using the learning data, a learned model for inferring the iterative synthesis parameter given to the programmable logic device development toolchain for succeeding in place and route from the resource usage rate data for each technology of the programmable logic device development toolchain and the timing slack information during the technology mapping An inference apparatus of the present disclosure includes: a data acquisition unit to acquire resource usage rate data for each technology of a programmable logic device development toolchain and timing slack information during technology mapping; and an inference unit to output an iterative synthesis parameter for succeeding in place and route from the resource usage rate data for each technology and the timing slack information during the technology mapping that are acquired by the data acquisition unit using a learned model for inferring an iterative synthesis parameter given to the programmable logic device development toolchain for succeeding in the place and route from the resource usage rate data for each technology and the timing slack information during the technology mapping.

A learning apparatus of the present disclosure includes: a data acquisition unit to acquire learning data including a target clock frequency of a programmable logic device development toolchain, an iterative synthesis parameter, resource usage rate data for each technology of the programmable logic device development toolchain, and timing slack information during technology mapping; and a model generation unit to generate, using the learning data, a learned model for inferring a success probability of place and route from the target clock frequency of the programmable logic device development toolchain, the iterative synthesis parameter, the resource usage rate data for each technology, and the timing slack information during the technology mapping.

An inference apparatus of the present disclosure includes: a data acquisition unit to acquire a target clock frequency of a programmable logic device development toolchain, an iterative synthesis parameter, resource usage rate data for each technology of the programmable logic device development toolchain, and timing slack information during technology mapping; and an inference unit to output a success probability of place and route from the target clock frequency, the iterative synthesis parameter, the resource usage rate data for each technology, and the timing slack information during the technology mapping that are acquired by the data acquisition unit using a learned model for inferring the success probability of the place and route from the target clock frequency, the iterative synthesis parameter, the resource usage rate data for each technology, and the timing slack information during the technology mapping.

Advantageous Effects of Invention

According to the present disclosure, the high-speed place and route can be implemented when the user application circuit is developed by using the programmable logic device.

DESCRIPTION OF EMBODIMENTS

With reference to the drawings, embodiments of the present invention will be described below.

First Embodiment

Figure 1:
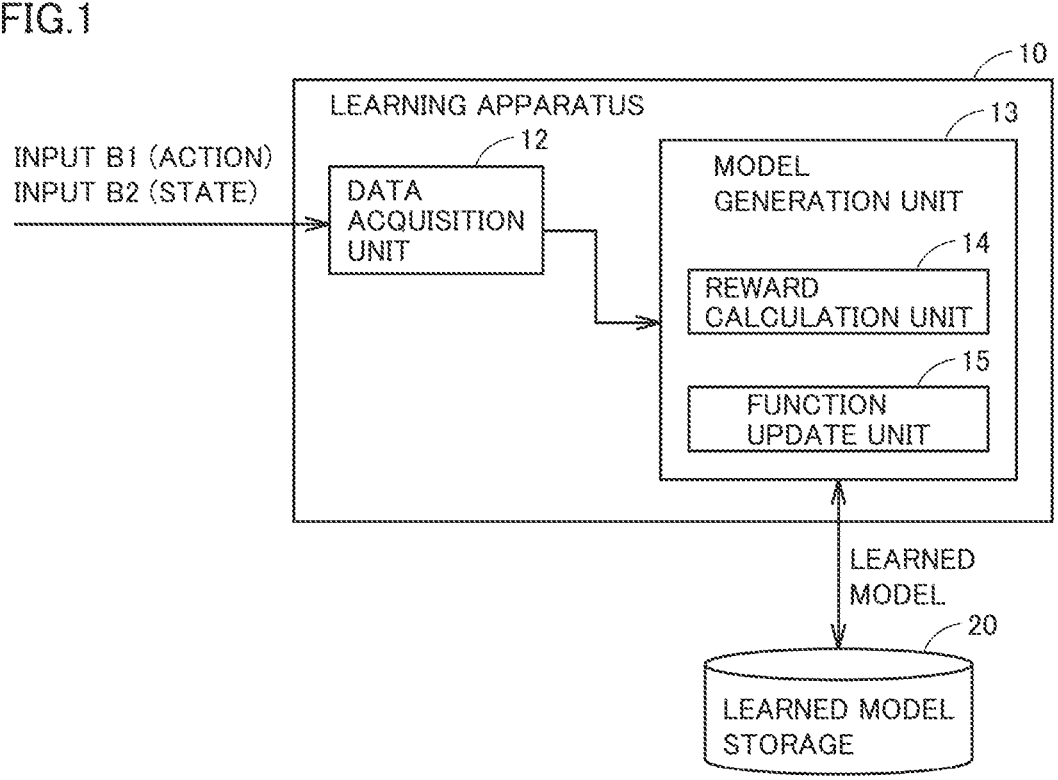
FIG. 1 is a configuration diagram illustrating a learning apparatus 10 related to a programmable logic device development toolchain according to a first embodiment.

FIG. 1 is a configuration diagram illustrating a learning apparatus 10 related to a programmable logic device development toolchain according to a first embodiment. Learning apparatus 10 includes a data acquisition unit 12 and a model generation unit 13.

Data acquisition unit 12 acquires a target clock frequency, an iterative synthesis parameter, resource usage rate data for each technology, and timing slack information during technology mapping as learning data.

The target clock frequency is a target clock frequency at which the programmable logic device is actually operated.

The iterative synthesis means that the place and route is tried a plurality of times in order to achieve the target clock frequency after the place and route. For example, in the iterative synthesis, a target clock frequency or a clock frequency higher than the target clock frequency is set as a center frequency X [MHz], a range of a threshold σ [MHz] is set on a lower side and a higher side of the frequency, namely, a range from (X−σ) [MHz] to (X+σ) [MHz] is set, and trial of the place and route is repeated while the range is changed by a step value Δ [MHz]. The number of trials of iterative synthesis is (2σ/Δ+1) times. The iterative synthesis parameter refers to X, σ, and Δ described above. The lower limit value (X−σ) is a value larger than the target clock frequency.

The resource usage rate data for each technology indicates a ratio of the number of used resources to the number of usable resources for each of various arithmetic resources in a programmable logic device.

For example, the resource usage rate data for each technology includes a result of technology mapping of the programmable logic device, a usage rate of an arithmetic logic unit (ALU), a usage rate of a multiplexer, a usage rate of an adder, a usage rate of a subtractor, and a usage rate of an arithmetic shifter of a logic element (LE) or a processing element (PE).

As a result of static timing analysis after the technology mapping, the timing slack information during the technology mapping includes a margin of timing to a cycle time in the largest signal propagation delay time (critical path) among signal propagation delay times between flip flops (FFs) in a programmable device with respect to the cycle time determined by the target clock frequency. For example, when the cycle time determined by the target clock frequency of 100 [MHz] is 10.0 [ns] and when the signal propagation delay time between flip flops (FFs) in the critical path is 7.0 [ns], the timing slack is 10.0 [ns]−7.0 [ns]=3.0 [ns].

Using the learning data including the target clock frequency, the iterative synthesis parameter, the resource usage rate data for each technology, and the timing slack information during the technology mapping that are acquired by data acquisition unit 12, model generation unit 13 generates a learned model for inferring the iterative synthesis parameter given to the programmable logic device development toolchain in order to make the place and route successful from the resource usage rate data for each technology of the programmable logic device development toolchain and the timing slack information during the technology mapping.

The iterative synthesis parameter is a clock center frequency X [MHz] for performing the above-described iterative synthesis, a threshold σ [MHz] for determining a frequency range of a low frequency side and a high frequency side, and a step value Δ [MHz] for repeating the trial of the place and route while changing the frequency range.

The "iterative synthesis parameter making the place and route successful" is a combination of the threshold σ [MHz] and the step value Δ [MHz] that satisfy a condition that the center clock frequency at which a circuit after the place and route can achieve target signal processing performance and each place and route result during execution of the iterative synthesis has the highest probability of being successful and the number of attempts of the place and route are the smallest.

In order to satisfy the above condition, for example, the combination of the threshold value σ [MHz] and the step value Δ [MHz] is determined by selecting the small threshold value σ to narrow the frequency range or selecting the large step value Δ to reduce the number of attempts of the place and route.

It is necessary that the arithmetic resources to be used do not exceed the maximum number of arithmetic resources, and that the interconnect resource to be used does not exceed the maximum number of interconnect resources that can be used on the programmable logic device, and that the largest value of the signal propagation delay time between flip flops (FFs) does not exceed the cycle time determined by the target clock frequency.

A known algorithm such as supervised learning, unsupervised learning, or reinforcement learning can be used as a learning algorithm used by model generation unit 13. The case where the reinforcement learning is applied will be described as an example. In the reinforcement learning, the agent (action subject) in a certain environment observes the current state (environmental parameter) and determines the action to be taken. The environment dynamically changes according to the action of the agent, and a reward is given to the agent according to the change in the environment. The agent repeats this, and learns an action policy that maximizes the reward through a series of actions. Q-learning or TD-learning (temporal difference learning), which is a representative method of the reinforcement learning, can be used. For example, in the case of the Q-learning, a general update formula of an action value function Q(s,a) is expressed by expression (1).

[Mathematical formula 1]

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In expression (1), $s_t$ represents the state of the environment at time t. $a_t$ represents the action at time t. Action $a_t$ changes the state to $s_{t+1}$. $r_{t+1}$ represents the reward given by the change in the state. $\gamma$ represents a discount rate. $\alpha$ represents a learning coefficient. The ranges of $0<\gamma\le1$ and $0<\alpha\le1$ are set. The iterative synthesis parameter is the action $a_t$. The resource usage rate data for each technology and the timing slack information during the technology mapping are the state $s_t$. In the Q-learning, the best action $a_t$ in the state $s_t$ at the time t is learned.

The update expression represented by expression (1) increases an action value Q when the action value Q of action a having a Q value at time t+1 is larger than the action value Q of the action a executed at time t, and the update expression decreases the action value Q in the opposite case. In other words, the action value function Q(s,a) is updated such that the action value Q of the action a at the time t approaches the best action value at the time t+1. Therefore, the best action value in a certain environment is sequentially propagated to the action value in the previous environment.

As described above, when the learned model is generated by the reinforcement learning, model generation unit 13 includes a reward calculation unit 14 and a function update unit 15.

Reward calculation unit 14 calculates the reward based on the target clock frequency and the iterative synthesis parameter, the resource usage rate data for each technology, and the timing slack information during the technology mapping. Reward calculation unit 14 calculates a reward r based on the result of the place and route. For example, reward calculation unit 14 increases the reward r when the place and route succeeds (for example, the reward of "1" is given), and decreases the reward r when the place and route fails (for example, the reward of "−1" is given).

Specifically, when the place and route succeeds, reward calculation unit 14 increases the reward in proportion to the margin (%) of the usage rate of the LE or PE in the programmable logic device, increases the reward in proportion to the margin (%) of the interconnect resource in the programmable logic device, or increases the reward in proportion to the margin (positive slack value) of the timing with respect to the cycle time in the largest signal propagation delay time (critical path) of the signal propagation delay times between the FFs (Flip Flops) in the programmable logic device. Reward calculation unit 14 may increase the reward by combining a plurality of elements in these three elements increasing the reward (operation resource margin, interconnect resource margin, critical path timing margin), or increase the reward by multiplying each element by a weighting factor as necessary.

When the place and route fails, reward calculation unit 14 decreases the reward in proportion to a degree of overflow of the LE or PE in the programmable logic device, decreases the reward in proportion to a degree of overflow of the interconnect resource in the programmable logic device, or decreases the reward in proportion to a degree of timing violation (negative slack value) or a total timing violation degree (total negative slack value) with respect to the cycle time in the largest signal propagation delay time (critical path) of the signal propagation delay times between the FFs (Flip Flop) in the programmable device when the resources is not overflown. Reward calculation unit 14 may decrease the reward by combining a plurality of elements in these three elements decreasing the reward (degree of overflow of operation resource, degree of overflow of interconnect resource, and degree of timing violation), or decrease the reward by multiplying each element by the weighting factor as necessary.

Function update unit 15 updates the function determining the iterative synthesis parameter in order to make the place and route successful according to the reward calculated by reward calculation unit 14, and outputs the updated function to a learned model storage 20. For example, in the case of the Q-learning, function update unit 15 uses the action value function $Q(s_t, a_t)$ represented by expression (1) as a function calculating the iterative synthesis parameter causing the place and route to succeed.

The above learning is repeatedly executed. Learned model storage 20 stores the action value function $Q(s_t, a_t)$ updated by function update unit 15, namely, the learned model.

Figure 2:
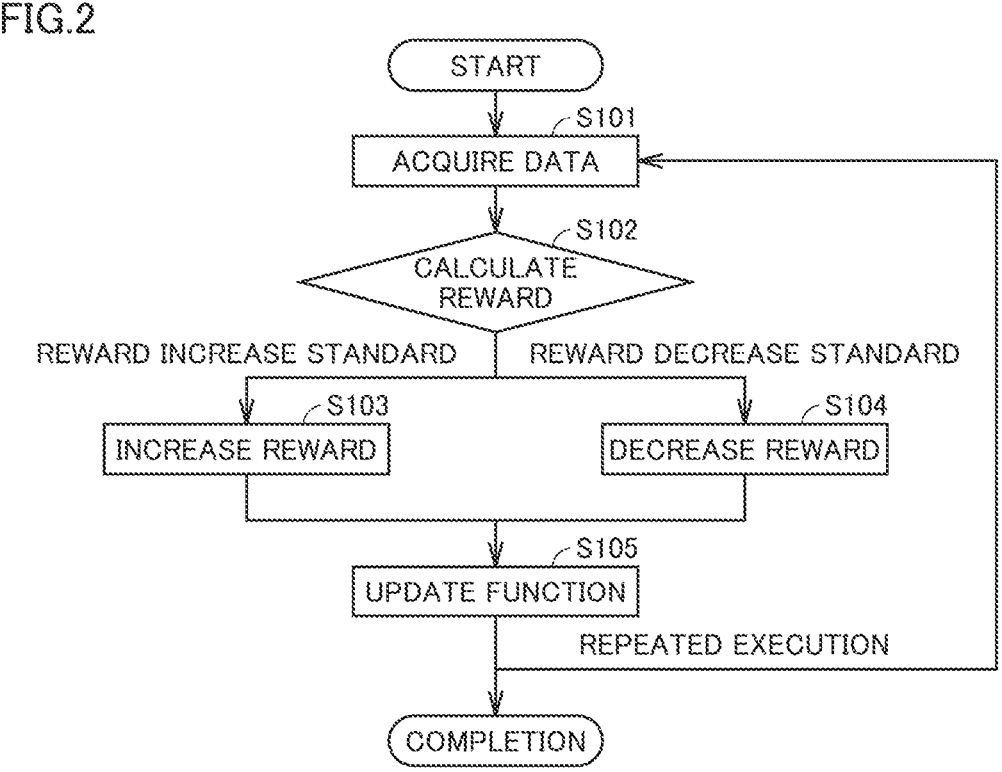
FIG. 2 is a flowchart related to learning processing of learning apparatus 10 of the first embodiment.

With reference to FIG. 2, learning processing performed by learning apparatus 10 will be described below. FIG. 2 is a flowchart related to the learning processing of learning apparatus 10 of the first embodiment.

In step S101, data acquisition unit 12 acquires the target clock frequency, the iterative synthesis parameter, the resource usage rate data for each technology, and the timing slack information during the technology mapping as learning data.

In step S102, model generation unit 13 calculates the reward based on the target clock frequency, the iterative synthesis parameter, the resource usage rate data for each technology, and the timing slack information during the technology mapping. Specifically, reward calculation unit 14 acquires the target clock frequency, the iterative synthesis parameter, the resource usage rate data for each technology, and the timing slack information during the technology mapping, and determines whether to increase or decrease the reward based on the result of the place and route. When reward calculation unit 14 determines that the reward is increased, the processing proceeds to step S103. When reward calculation unit 14 determines that the reward is decreased, the processing proceeds to step S104.

In step S103, reward calculation unit 14 increases the reward.

In step S104, reward calculation unit 14 decreases the reward.

In step S105, function update unit 15 updates the action value function Q(st, at) represented by expression (1) stored in learned model storage 20 based on the reward calculated by reward calculation unit 14.

Learning apparatus 10 repeatedly executes the steps S101 to S105 and stores the generated action value function Q(st, at) as the learned model.

Although learning apparatus 10 of the first embodiment stores the learned model in learned model storage 20 provided outside learning apparatus 10, learned model storage 20 may be provided inside learning apparatus 10.

Figure 3:
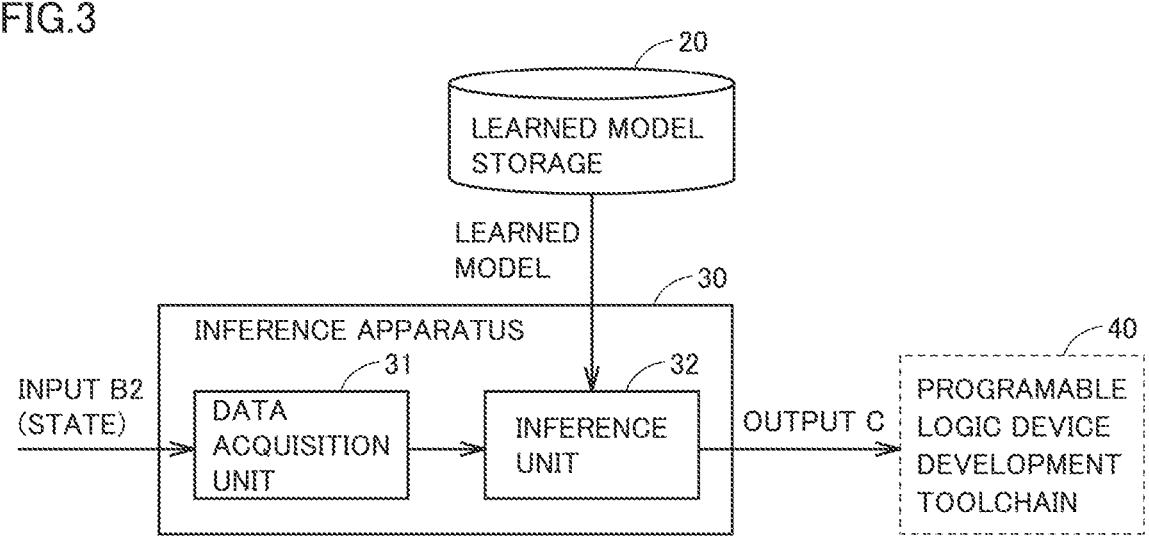
FIG. 3 is a configuration diagram illustrating an inference apparatus 30 related to the programmable logic device development toolchain of the first embodiment.

FIG. 3 is a configuration diagram illustrating an inference apparatus 30 related to the programmable logic device development toolchain of the first embodiment. Inference apparatus 30 includes a data acquisition unit 31 and an inference unit 32.

The data acquisition unit 31 acquires resource usage rate data for each technology and timing slack information during technology mapping.

Inference unit 32 reads, from learned model storage 20, the learned model for inferring the iterative synthesis parameter given to the programmable logic device development toolchain in order to succeed in the place and route from the resource usage rate data for each technology of the programmable logic device development toolchain and the timing slack information during the technology mapping.

Inference unit 32 uses the data acquired by data acquisition unit 31 and the learned model to infer the iterative synthesis parameter making the place and route successful. That is, by inputting the resource usage rate data for each technology and the timing slack information during the technology mapping that are acquired by data acquisition unit 31 to the learned model, inference unit 32 can infer the iterative synthesis parameter in order to cause the place and route suitable for the resource usage rate data for each technology and the timing slack information during the technology mapping to succeed.

For example, inference unit 32 reads the action value function $Q(s_t, a_t)$ as the learned model from learned model storage 20. Inference unit 32 obtains the iterative synthesis parameter (action $a_t$) based on the action value function $Q(s,a)$ with respect to the resource usage rate data for each technology and the timing slack information (state $s_t$) during the technology mapping. The iterative synthesis parameter included in the action $a_t$ is an iterative synthesis parameter for succeeding in the place and route.

In the first embodiment, the iterative synthesis parameter for succeeding in the place and route is output by using the learned model learned by model generation unit 13 of the programmable logic device development toolchain. However, the learned model may be acquired from another programmable logic device development toolchain, and the iterative synthesis parameter for succeeding in the place and route may be output based on the learned model.

Figure 4:
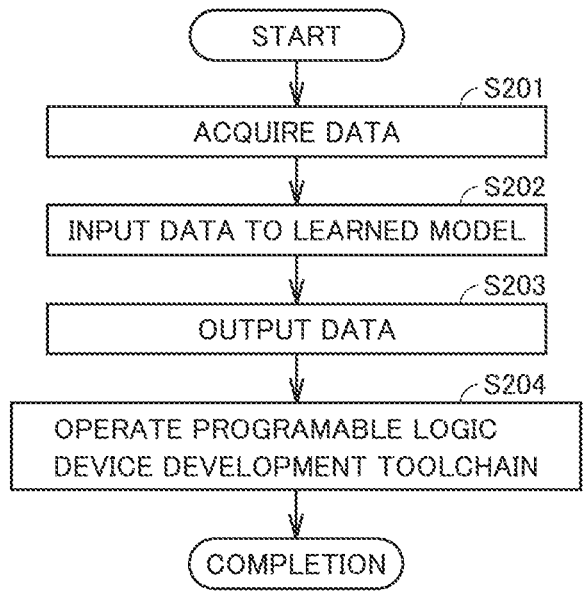
FIG. 4 is a flowchart illustrating an inference procedure of an iterative synthesis parameter by inference apparatus 30 of the first embodiment.

With reference to FIG. 4, processing for obtaining the iterative synthesis parameter in order to make the place and route successful will be described below.

FIG. 4 is a flowchart illustrating an inference procedure of the iterative synthesis parameter by inference apparatus 30 of the first embodiment.

In step S201, the data acquisition unit 31 acquires the resource usage rate data for each technology and the timing slack information during the technology mapping.

In step S202, inference unit 32 inputs the resource usage rate data for each technology and the timing slack information during the technology mapping to the learned model stored in learned model storage 20.

In step S203, inference unit 32 obtains the iterative synthesis parameter in order to make the place and route successful from the learned model. Inference unit 32 outputs the obtained iterative synthesis parameter making the place and route successful to the programmable logic device development toolchain.

In step S204, the programmable logic device development toolchain repeats the trial of the place and route using the actual processing element (PE), logic element (LE), static random access memory (SRAM), and interconnect resources on the programmable device, namely, performs the iterative synthesis, using the output the iterative synthesis parameter for succeeding in the place and route and the circuit configuration information by the technology mapping. At this point, the synthesis constraint of the iterative synthesis is an iterative synthesis parameter for succeeding in the place and route output in step S203. A frequency range from (X−σ) [MHz] to (X+σ) [MHz] is set using the center frequency X [MHz], the threshold σ [MHz], and the step value Δ [MHz], and the clock frequency is changed within the range by the step value Δ [MHz]. In this case, the number of trials of the iterative synthesis is (2σ/Δ+1) times. Thus, the place and route can be successfully performed at the clock frequency or more at which the target signal processing performance can be achieved by the smallest number of times of the trial of the place and route, namely, the trial of the place and route in a short time.

In the first embodiment, the case where the reinforcement learning is applied to the learning algorithm used by the inference unit has been described. However, the present invention is not limited thereto. Supervised learning, unsupervised learning, semi-supervised learning, or the like can be applied as the learning algorithm in addition to the reinforcement learning.

Deep learning that learns extraction of the feature amount itself can also be used as a learning algorithm used in model generation unit 13. Alternatively, machine learning may be performed according to other known methods such as a neural network, genetic programming, functional logic programming, or a support vector machine.

For example, learning apparatus 10 and inference apparatus 30 may be connected to the programmable logic device development toolchain through a network, and be a separate device from the programmable logic device development toolchain. Furthermore, learning apparatus 10 and inference apparatus 30 may be built in the programmable logic device development toolchain. Furthermore, learning apparatus 10 and inference apparatus 30 may exist on a cloud server.

Model generation unit 13 may learn the iterative synthesis parameter in order to succeed in the place and route using the learning data acquired from a plurality of programmable logic device development toolchains. Model generation unit 13 may acquire the learning data from the plurality of programmable logic device development toolchains used in the same place, or acquire the learning data from the plurality of programmable logic device development toolchains independently operating in different places. The programmable logic device development toolchain that collects the learning data can be added to or removed from the target in the middle. Furthermore, the learning apparatus that learns the iterative synthesis parameter for succeeding in the place and route with respect to a certain programmable logic device development toolchain may be applied to another programmable logic device development toolchain, and the iterative synthesis parameter for succeeding in the place and route may be relearned and updated with respect to the another programmable logic device development toolchain.

As described above, according to the first embodiment, the clock center frequency and the frequency range obtained by the inference result by the artificial intelligence are used in the process of repeatedly executing the place and route using the development toolchain of the programmable device and finding the clock and the timing constraint condition in which the place and route succeeds. Thus, the number of times of the trial of the place and route process can be significantly reduced, so that the time required for the place and route process can be significantly shortened.

Second Embodiment

Figure 5:
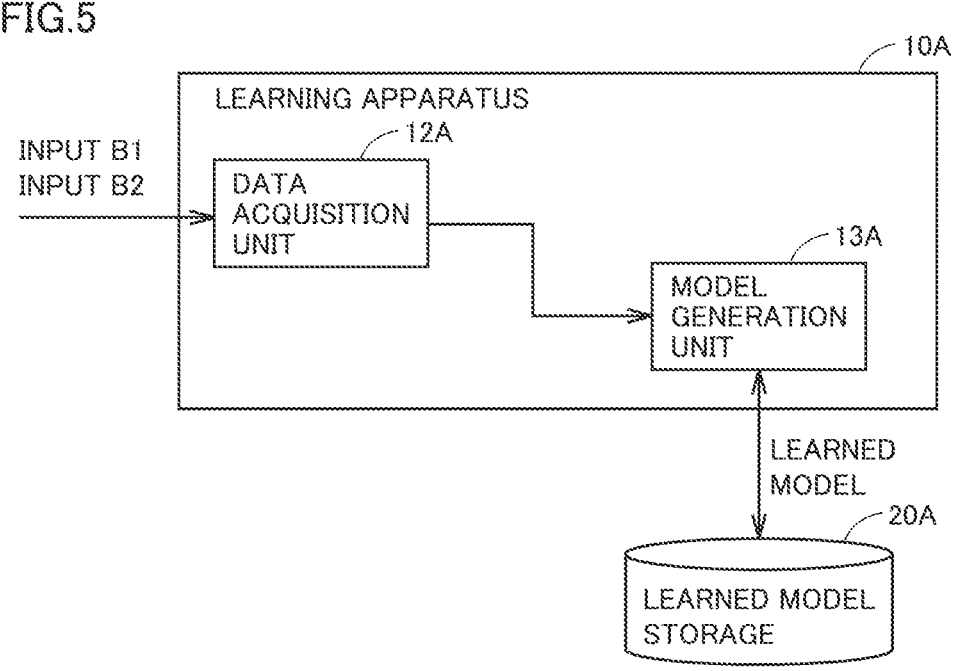
FIG. 5 is a view illustrating a configuration of a learning apparatus 10A related to a programmable logic device development toolchain according to a second embodiment.

FIG. 5 is a view illustrating a configuration of a learning apparatus 10A related to a programmable logic device development toolchain according to a second embodiment.

Learning apparatus 10A includes a data acquisition unit 12A and a model generation unit 13A.

Data acquisition unit 12A acquires the clock frequency, the iterative synthesis parameter, the resource usage rate data for each technology, and the timing slack information during the technology mapping as the learning data.

Model generation unit 13A learns the success probability of the place and route based on the learning data produced based on the combination of the clock frequency, the iterative synthesis parameter, the resource usage rate data for each technology, and the timing slack information during the technology mapping that are output from data acquisition unit 12A. That is, the learned model for inferring the success probability of the place and route from the clock frequency of the programmable logic device development toolchain, the iterative synthesis parameter, the resource usage rate data for each technology, and the timing slack information during the technology mapping is generated. At this point, the learning data is data in which the clock frequency, the iterative synthesis parameter, the resource usage rate data for each technology, and the timing slack information during the technology mapping are associated with each other. When the AI is utilized in the programmable logic device development toolchain, the learned model is configured as a model classifying (clustering) the clock frequency, the iterative synthesis parameter, the resource usage rate data for each technology, and the timing slack information during the technology mapping when the place and route succeeds, and the clock frequency, the iterative synthesis parameter, the resource usage rate data for each technology, and the timing slack information during the technology mapping when the place and route fails.

A known algorithm such as the supervised learning, the unsupervised learning, and the reinforcement learning can be used as the learning algorithm used by model generation unit 13A. The case where a K-means method (clustering) that is the unsupervised learning is applied will be described as an example. The unsupervised learning refers to a technique of learning features in the learning data by providing the learning data not including a result (label) to the learning apparatus.

For example, model generation unit 13A learns the success probability of the place and route by what is called the unsupervised learning according to a grouping technique by the K-means method.

The K-means method is a non-hierarchical clustering algorithm, and is a technique of classifying a given number of clusters into k using an average of clusters.

Specifically, the K-means method is processed in the following flow. First, the cluster is randomly allocated to each piece of data xi. Subsequently, a center Vj of each cluster is calculated based on the allocated data. Subsequently, a distance between each xi and each Vj is determined, and xi is reallocated to the nearest center cluster. Then, when the allocation of the clusters of all xi does not change in the above processing, or when a change amount falls below a predetermined threshold, it is determined that convergence is generated, and the processing is ended.

In the present disclosure, the success probability of the place and route is learned by what is called the unsupervised learning according to the learning data produced based on the combination of the clock frequency, the iterative synthesis parameter, the resource usage rate data for each technology, and the timing slack information during the technology mapping that are acquired by data acquisition unit 12A.

Model generation unit 13A generates and outputs the learned model by executing the learning as described above.

A learned model storage 20A stores the learned model output from model generation unit 13A.

Figure 6:
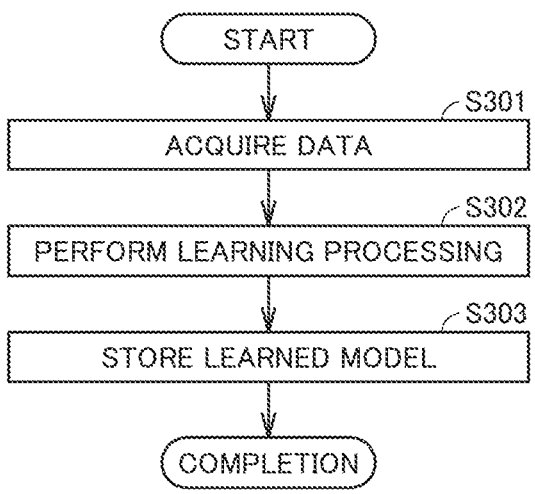
FIG. 6 is a flowchart related to learning processing of learning apparatus 10A of the second embodiment.

With reference to FIG. 6, processing learned by learning apparatus 10A will be described below. FIG. 6 is a flowchart related to learning processing of learning apparatus 10A of the second embodiment.

In step S301, data acquisition unit 12A acquires the clock frequency, the iterative synthesis parameter, the resource usage rate data for each technology, and the timing slack information during the technology mapping. Although the clock frequency, the iterative synthesis parameter, the resource usage rate data for each technology, and the timing slack information during the technology mapping are simultaneously acquired, it is sufficient that the clock frequency, the iterative synthesis parameter, the resource usage rate data for each technology, and the timing slack information during the technology mapping can be input in association with each other, and the clock frequency, the iterative synthesis parameter, the resource usage rate data for each technology, and the data of the timing slack information during the technology mapping may be acquired at different timings.

In step S302, model generation unit 13A learns the success probability of the place and route by what is called the unsupervised learning according to the learning data produced based on the combination of the clock frequency, the iterative synthesis parameter, the resource usage rate data for each technology, and the timing slack information during the technology mapping that are acquired by data acquisition unit 12A, and generates the learned model.

In step S303, learned model storage 20A stores the learned model generated by model generation unit 13A.

Figure 7:
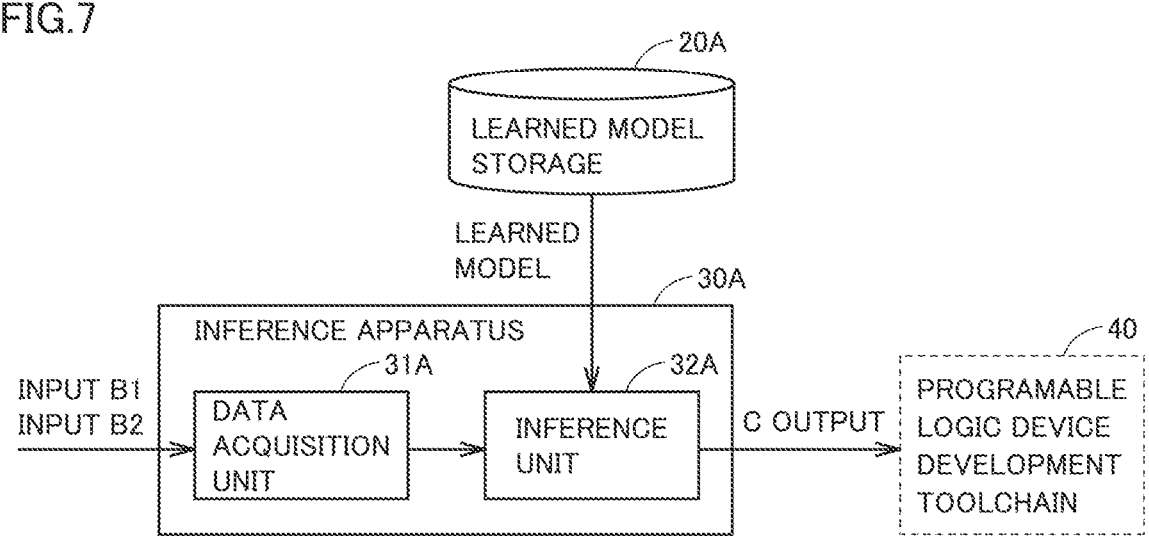
FIG. 7 is a view illustrating a configuration of an inference apparatus 30A related to the programmable logic device development toolchain of the second embodiment.

FIG. 7 is a view illustrating a configuration of an inference apparatus 30A related to the programmable logic device development toolchain of the second embodiment. Inference apparatus 30A includes a data acquisition unit 31A and an inference unit 32A.

The data acquisition unit 31A acquires the clock frequency, the iterative synthesis parameter, the resource usage rate data for each technology, and the timing slack information during the technology mapping.

Inference unit 32A infers the success probability of the place and route obtained using the learned model stored in learned model storage 20A. That is, inference unit 32A can infer to which cluster the clock frequency, the iterative synthesis parameter, the resource usage rate data for each technology, and the timing slack information during the technology mapping belong by inputting the clock frequency, the iterative synthesis parameter, the resource usage rate data for each technology, and the timing slack information during the technology mapping that are acquired by data acquisition unit 31A to the learned model, and inference unit 32A can output the inference result as the success probability of the place and route. When the AI is utilized in the programmable logic device development toolchain, inference unit 32A determines whether the clock frequency, the iterative synthesis parameter, the resource usage rate data for each technology, and the timing slack information during the technology mapping that are input to the learned model belong to the cluster indicating the success of the place and route or belong to the cluster indicating the failure of the place and route. Then, in the case of belonging to the cluster indicating the success of the place and route, inference unit 32A infers that the place and route succeeds. On the other hand, in the case of belonging to the cluster indicating the failure of the place and route, the inference unit infers that the place and route fails.

Alternatively, inference unit 32A may input the clock frequency, the iterative synthesis parameter, the resource usage rate data for each technology, and the timing slack information during the technology mapping that are acquired by data acquisition unit 31A to the learned model to infer and output the probability that the clock frequency, the iterative synthesis parameter, the resource usage rate data for each technology, and the timing slack information during the technology mapping belong to the cluster indicating the success of the place and route. For example, the probability belonging to the cluster indicating the success of the place and route may be larger as the distance between the clock frequency, the iterative synthesis parameter, the resource usage rate data for each technology, and the timing slack information during the technology mapping that are input to the learned model and the center of gravity of the cluster indicating the success of the place and route is smaller.

Alternatively, model generation unit 13A may use a soft clustering technique instead of the K-means method to generate a model that generates the probability belonging to the cluster indicating the success of the place and route, and inference unit 32A may use the soft clustering technique to infer the probability belonging to the cluster indicating the success of the place and route from the generated model.

In the second embodiment, the description has been given assuming that the success probability of the place and route is output using the learned model learned by the model generation unit of the programmable logic device development toolchain. However, the learned model may be acquired from the outside such as another programmable logic device development toolchain, and the success probability of the place and route may be output based on the learned model.

In this way, inference unit 32A outputs the success probability of the place and route obtained based on the clock frequency, the iterative synthesis parameter, the resource usage rate data for each technology, and the timing slack information during the technology mapping to the input and output unit of the programmable logic device development toolchain. For example, a display device such as a display can be cited as the input and output unit.

Figure 8:
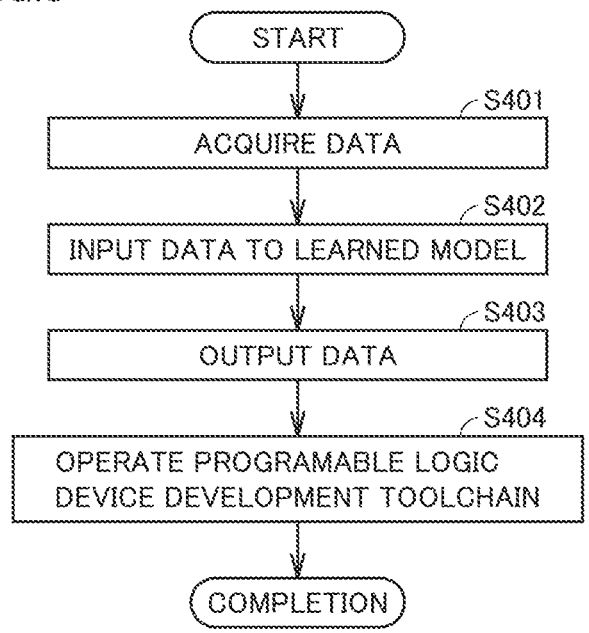
FIG. 8 is a flowchart illustrating an inference procedure of a success probability of place and route of the inference apparatus 30A of the second embodiment.

With reference to FIG. 8, processing for obtaining the success probability of the place and route using inference apparatus 30A will be described below.

FIG. 8 is a flowchart illustrating an inference procedure of the success probability of the place and route of inference apparatus 30A of the second embodiment.

In step S401, the data acquisition unit 31A acquires the clock frequency, the iterative synthesis parameter, the resource usage rate data for each technology, and the timing slack information during the technology mapping.

In step S402, inference unit 32A inputs the clock frequency, the iterative synthesis parameter, the resource usage rate data for each technology, and the timing slack information during the technology mapping to the learned model stored in learned model storage 20A, and obtains the success probability of the place and route.

In step S403, inference unit 32A outputs the success probability of the place and route obtained by the learned model to the programmable logic device development toolchain.

In step S404, in consideration of the output success probability of the place and route, the programmable logic device development toolchain repeats the trial of the place and route using the actual processing element (PE), logic element (LE), static random access memory (SRAM), and interconnect resource on the programmable device, namely, performs the iterative synthesis. Thus, the success probability of the place and route can be displayed on the display device such as display.

In the second embodiment, the case where the unsupervised learning is applied to the learning algorithm used by model generation unit 13A and inference unit 32A has been described. However, the present invention is not limited thereto. The reinforcement learning, the supervised learning, the semi-supervised learning, or the like can be applied as the learning algorithm in addition to the unsupervised learning.

Furthermore, as a learning algorithm used for learning, the deep learning that learns extraction of a feature amount itself can be used, and another known method may be used.

When the unsupervised learning in the second embodiment is implemented, the method is not limited to the non-hierarchical clustering by the K-means method as described above, but any other known method that can perform clustering may be used. For example, hierarchical clustering such as a shortest distance method may be used.

In the second embodiment, for example, learning apparatus 10A and inference apparatus 30A may be connected to the programmable logic device development toolchain through the network, and may be devices separate from the programmable logic device development toolchain. Furthermore, learning apparatus 10A and inference apparatus 30A may be built in the programmable logic device development toolchain. Furthermore, learning apparatus 10A and inference apparatus 30A may exist on a cloud server.

Model generation unit 13A may learn the success probability of the place and route according to the learning data produced for the plurality of programmable logic device development toolchains. Note that model generation unit 13A may acquire the learning data from the plurality of programmable logic device development toolchains used in the same area, or learn the success probability of the place and route using the learning data collected from the plurality of programmable logic device development toolchains independently operating in different areas. In addition, the programmable logic device development toolchain collecting the learning data can be added to or removed from the target in the middle. Furthermore, the learning apparatus that learns the success probability of the place and route with respect to a certain programmable logic device development toolchain may be applied to another programmable logic device development toolchain, and the success probability of the place and route may be relearned and updated with respect to the another programmable logic device development toolchain.

Figure 9:
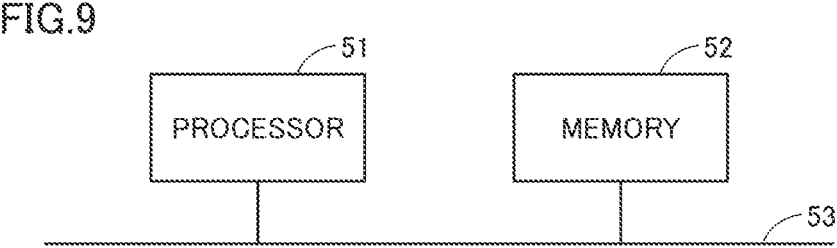
FIG. 9 is a view illustrating a hardware configuration of the learning apparatuses 10, 10A, the inference apparatuses 30, 30A, or a programmable logic device development toolchain 40.

FIG. 9 is a view illustrating a hardware configuration of the learning apparatuses 10, 10A, the inference apparatuses 30, 30A, or a programmable logic device development toolchain 40.

In the learning apparatuses 10, 10A, the inference apparatuses 30, 30A, and programmable logic device development toolchain 40, corresponding operations can be configured by hardware or software of a digital circuit. When the functions of the learning apparatuses 10, 10A, the inference apparatuses 30, 30A, and programmable logic device development toolchain 40 are implemented using software, for example, as illustrated in FIG. 9, the learning apparatuses 10, 10A, the inference apparatuses 30, 30A, and programmable logic device development toolchain 40 include a processor 51 and a memory 52 that are connected by a bus 53, and processor 51 can execute the program stored in memory 52.

It should be considered that the disclosed embodiments are an example in all respects and not restrictive. The scope of the present disclosure is defined by not the description above, but the claims, and it is intended that all modifications within the meaning and scope of the claims and their equivalents are included in the present invention.

REFERENCE SIGNS LIST

10, 10A: learning apparatus, 12, 12A: data acquisition unit, 13, 13A: model generation unit, 14: reward calculation unit, 15: function update unit, 20, 20A: learned model storage, 31, 31A: data acquisition unit, 32, 32A: inference unit, 40: programmable logic device development toolchain, 51: processor, 52: memory, 53: bus

The invention claimed is:

1. A learning apparatus comprising:
   a data acquirer to acquire learning data including resource usage rate data for each technology of a programmable logic device development toolchain and timing slack information during technology mapping and including a target clock frequency of the programmable logic device development toolchain and an iterative synthesis parameter in the resource usage rate data for each technology and the timing slack information during the technology mapping; and
   a model generator to generate, using the learning data, a learned model for inferring the iterative synthesis parameter given to the programmable logic device development toolchain for succeeding in place and route from the resource usage rate data for each technology of the programmable logic device development toolchain and the timing slack information during the technology mapping.

2. The learning apparatus according to claim 1, wherein the resource usage rate data for each technology includes a usage rate of an arithmetic logic circuitry, a usage rate of multiplexers, a usage rate of adders, a usage rate of subtractors, and a usage rate of an arithmetic shifters of logic elements or processing elements in the programmable logic device.

3. The learning apparatus according to claim 1, wherein the timing slack information during the technology mapping includes a margin value with respect to the cycle time determined by the target clock frequency in the longest signal path between flip-flops in the programmable logic device.

4. The learning apparatus according to claim 1, wherein the iterative synthesis parameter includes:
   a central clock frequency;
   a threshold to determine a lower limit value and an upper limit value of a clock frequency; and
   a step value to cover a range from the lower limit value to the upper limit value of the clock frequency determined using the threshold.

5. The learning apparatus according to claim 4, wherein the iterative synthesis parameter for succeeding in the place and route includes:
   the central clock frequency for achieving performance of target signal processing of a circuit after the place and route; and
   a combination of the threshold and the step value that satisfy a condition that a probability of succeeding in place and route during execution of iterative synthesis is highest and a number of trials of the place and route is smallest.

6. The learning apparatus according to claim 1, wherein the model generator increases a reward in accordance with margin of a usage rate of a logic element or a processing element in the programmable logic device, a margin of a usage rate of an interconnect resource in the programmable logic device, or a margin with respect to a cycle time in a largest signal propagation delay time between flip-flops in the programmable logic device when the place and route succeeds.

7. The learning apparatus according to claim 6, wherein the model generator decreases the reward in accordance with degree of overflow of the usage rate of the logic element or the processing element in the programmable logic device, a degree of overflow of the interconnect resource in the programmable logic device, or a degree of timing violation with respect to the cycle time in the longest signal path between the flip-flops in the programmable logic device when the place and route fails.

8. An inference apparatus comprising:
   a data acquirer to acquire resource usage rate data for each technology of a programmable logic device development toolchain and timing slack information during technology mapping; and
   an inferencer to output an iterative synthesis parameter for succeeding in place and route from the resource usage rate data for each technology and the timing slack information during the technology mapping that are acquired by the data acquirer, and using a learned model for inferring an iterative synthesis parameter given to the programmable logic device development toolchain for succeeding in the place and route from the resource usage rate data for each technology and the timing slack information during the technology mapping.

9. The inference apparatus according to claim 8, wherein the resource usage rate data for each technology includes a usage rate of an arithmetic logic circuitry, a usage rate of a multiplexers, a usage rate of an adders, a usage rate of a subtractors, and a usage rate of an arithmetic shifters of logic elements or a processing elements in a programmable logic device.

10. The inference apparatus according to claim 8, wherein the timing slack information during the technology mapping includes a margin value with respect to the cycle time determined by a target clock frequency of the programmable logic device development toolchain in a longest signal path between flip-flops in the programmable logic device.

11. The inference apparatus according to claim 8, wherein the iterative synthesis parameter for succeeding in the place and route includes:
   a central clock frequency for achieving performance of target signal processing of a circuit after the place and route; and
   a combination of a threshold to determine a lower limit value and an upper limit value of a clock frequency that satisfy a condition that a probability of succeeding in place and route during execution of iterative synthesis is highest and a number of trials of the place and route is smallest, and a step value to cover a range from the lower limit value to the upper limit value.

12. A programmable logic device development toolchain, wherein an iterative synthesis parameter is used for the succeeding in the place and route inferred by the inference apparatus according to claim 8.

13. A learning apparatus comprising:
a data acquirer to acquire learning data including a target clock frequency of a programmable logic device development toolchain, an iterative synthesis parameter, resource usage rate data for each technology of the programmable logic device development toolchain, and timing slack information during technology mapping; and
a model generator to generate, using the learning data, a learned model for inferring a success probability of place and route from the target clock frequency of the programmable logic device development toolchain, the iterative synthesis parameter, the resource usage rate data for each technology, and the timing slack information during the technology mapping.

14. An inference apparatus comprising:
a data acquirer to acquire a target clock frequency of a programmable logic device development toolchain, an iterative synthesis parameter, resource usage rate data for each technology of the programmable logic device development toolchain, and timing slack information during technology mapping; and
an inferencer to output a success probability of place and route from the target clock frequency, the iterative synthesis parameter, the resource usage rate data for each technology, and the timing slack information during the technology mapping that are acquired by the data acquirer, and using a learned model for inferring the success probability of the place and route from the target clock frequency, the iterative synthesis parameter, the resource usage rate data for each technology, and the timing slack information during the technology mapping.

* * * * *